Figure 1:
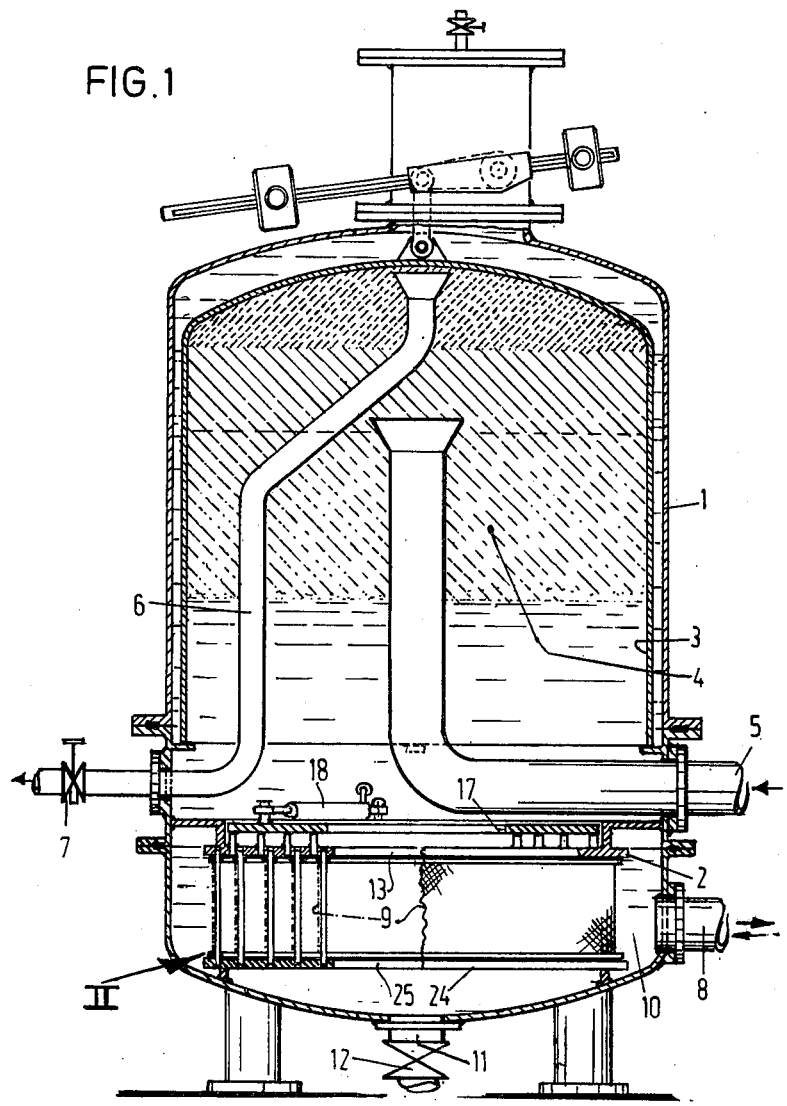

United States Patent [19]
Geurtsen

[11] 3,977,975
[45] Aug. 31, 1976

[54] APPARATUSES FOR THE SEPARATION OF MIXTURES OF LIQUIDS OF DIFFERENT GRAVITIES, E.G. OIL AND WATER

[75] Inventor: Alfonsus Antonius Geurtsen, Schalkhaar, Netherlands

[73] Assignee: Machinefabriek Geurtsen Deventer, B.V., Deventer, Netherlands

[22] Filed: Nov. 20, 1974

[21] Appl. No.: 525,518

[30] Foreign Application Priority Data
Dec. 14, 1973   Netherlands.................... 7317147

[52] U.S. Cl................................. 210/315; 210/82;
210/83; 210/125; 210/236; 210/333 R;
210/485; 210/522; 210/540
[51] Int. Cl.²......................................... B01D 35/14
[58] Field of Search................... 210/23, 79, 82, 83,
210/123, 125, 236, 315, 333.1, 337, 338,
339, 341, 342, 485, 493, 522, 534, 540

[56] References Cited
UNITED STATES PATENTS

| | | | |
|---|---|---|---|
| 1,144,854 | 6/1915 | Lass | 210/236 |
| 2,405,838 | 8/1946 | Lawson et al. | 210/23 R |
| 2,555,607 | 6/1951 | Robinson | 210/23 R |
| 2,651,414 | 9/1953 | Lawson | 210/23 R |
| 3,123,132 | 3/1964 | Hedgecock | 210/333.1 |
| 3,278,036 | 10/1966 | English | 210/333.1 |
| 3,450,632 | 6/1969 | Olson et al. | 210/23 R |
| 3,628,660 | 12/1971 | In'tveld | 210/125 X |
| 3,666,108 | 5/1972 | In'tveld | 210/537 X |
| 3,853,766 | 12/1974 | Gentry | 210/236 |

FOREIGN PATENTS OR APPLICATIONS
78,747   1/1971   Germany ......................... 210/493

*Primary Examiner*—Charles N. Hart
*Assistant Examiner*—Robert G. Mukai
*Attorney, Agent, or Firm*—Snyder, Brown & Ramik

[57] ABSTRACT

Apparatus to separate a mixture of liquids of different specific gravities, e.g. oil and water, said apparatus having in a closed vessel a separation space with means for controlling the discharge of lighter liquid therefrom and a multiple filter provided beneath said separation space and consisting of a series of filtering cloths separated from one another by intermediate chambers, the upper wall of each intermediate chamber being provided with passages opening into the lower region of the separation space and controllable by valve means.

4 Claims, 8 Drawing Figures

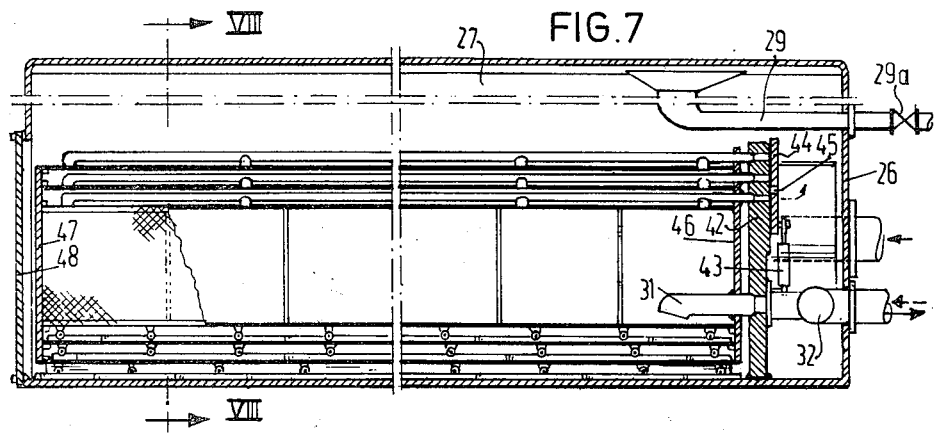
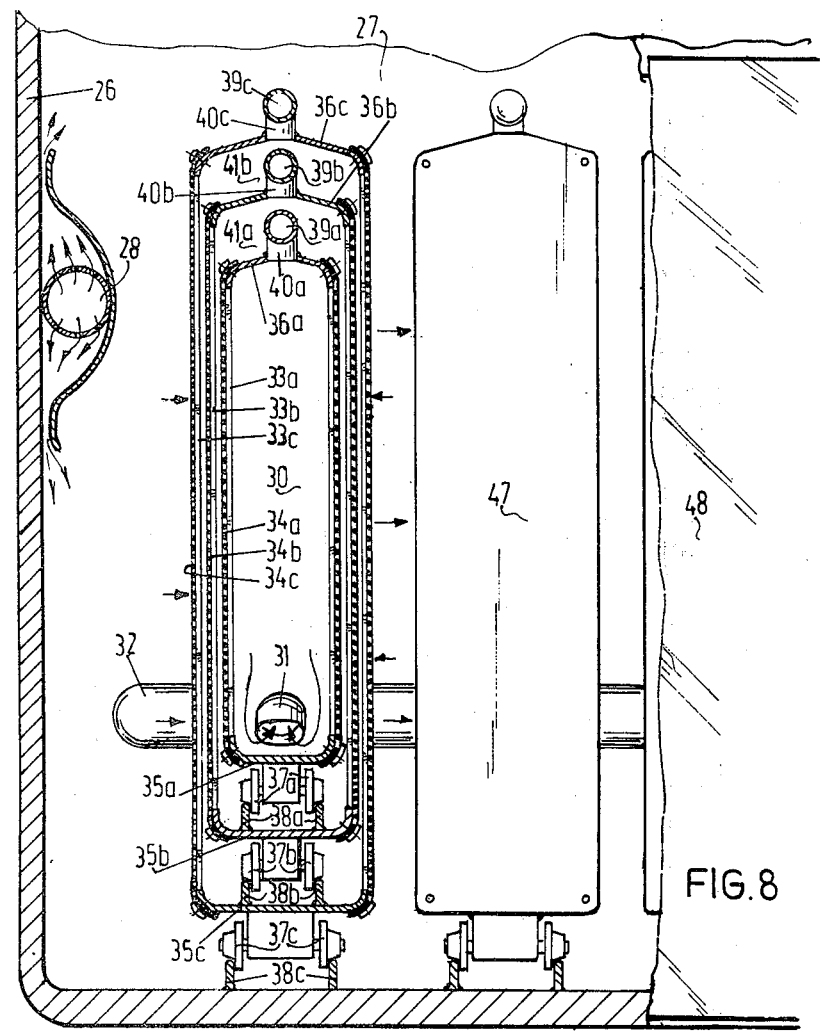

APPARATUSES FOR THE SEPARATION OF MIXTURES OF LIQUIDS OF DIFFERENT GRAVITIES, E.G. OIL AND WATER

The invention relates to an apparatus for the separation of a mixture of liquids of different specific gravities, e.g. oil and water, said apparatus comprising a closed vessel containing a separation space connected to a mixture supply conduit and a conduit for the discharge of the lighter liquid, a collecting chamber for the heavier liquid connected to a conduit for the discharge of the heavier liquid and a multiple filter provided between said separation space and said collecting chamber, said multiple filter consisting of at least one pair of filters which are connected in series and separated from one another by an intermediate chamber, said filters letting through almost exclusively the heavier liquid, one of said filters surrounding the other one and the or each intermediate chamber of said multiple filter being connected in a place on a high level to a passage leading back to the separation space.

An apparatus of this kind has been disclosed in the Dutch patent application No. 71.04915 laid open to public inspection. This known apparatus is provided with a number of concentrical filters in the shape of truncated cones, which lies with their lower edges against the bottom and with their upper edges against the upright cylindrical wall of the vessel.

The invention has the object to provide an apparatus of the described kind, of which the multiple filter, also when it has more than two filtering cloths operating in series, can be so accommodated in a relatively small space, as to allow in a separation apparatus having a vessel of given capacity the use of multiple filters having a relatively very large active area and many filtering cloths operating in series. Moreover the invention envisages to construct the apparatus in such a manner as to make it possible to rinse clean the filtering cloths one after the other in a simple way. The result thereof is that the separation apparatus can be kept in operation during a long time without the necessity of replacement of the filtering cloths.

According to the invention the object aimed at is achieved in that the passage connected to the or an intermediate chamber and leading back to the separation space opens into said space in a place under the layer of the lighter liquid of allowable maximum thickness which may be formed in the separation space and a valve is provided to open and to close said passage. By separately opening and closing of the passages leading back to the separation space each filtering cloth can be separately rinsed by a flow of liquid. This makes it possible to mount the filtering cloths at short distances from one another, since the or each intermediate chamber need not serve anymore as an additional settling space for lighter liquid which still passed the filtering cloth. Thus, many filtering cloths can be placed one after the other in a small place and said cloths can be arranged in such a pattern as to make their active areas relatively very large. As, furthermore, the liquids and impurities which are led from the chambers and the filtering cloths of the multiple filter back to the separation space enter this space in the part thereof, where the separation of the mixture has not yet been completed, the layer of lighter liquid accumulated in the upper part of the separation space will not be disturbed, so that the drawing off, of pure lighter liquid from said layer need not be stopped.

In an apparatus having a vertical vessel and filters which are situated concentrically to a vertical axis, consequently, in an apparatus of the kind disclosed by the mentioned Dutch patent application No. 71.04915, it is advantageous to use a construction, in which provided between the separation space and the collecting chamber for the heavier liquid is a horizontal or substantially horizontal transverse wall having a central opening and the filters are accommodated under said transverse wall and extend with their upper edges up to said wall and concentrically to the central opening thereof. This transverse wall may then be provided at the location of the or each intermediate chamber with apertures which can be controlled and connected with the separation space by a valve member. This construction is especially adapted for separation apparatuses having, for the automatic control of the discharge of lighter liquid, a bell which surrounds the separation space and is mounted, in the vessel, for up and down movement between two end positions. Such an apparatus is for instance known from the Dutch patent application No. 67.03838 laid open for public inspection.

In the described apparatus having a vertical vessel the apertures of the transverse wall may be covered by a common annular plate which is concentric to the vertical axis of the filters and is adapted to be rotated about said axis. This plate may then be provided with a central opening corresponding to the central opening of the transverse wall and with holes or slots which can at least be brought by rotation into register with the transverse wall apertures provided at the location of the or each intermediate chamber of the multiple filter. Moreover, each filter may consist of a cage formed by a number of vertical rods arranged on a larger circle, a number of vertical rods arranged between the radii of the former rods on a concentrical smaller cirlce and at least two zigzag-shaped strips which are attached to the ends of said rods and form a closed pattern, each part of said strips extending between a rod of the inner circle and a rod of the outer circle, an endless filtering cloth which is bent in zigzag over the rods of said cage and of means for fastening the edges of said filtering cloth to said zigzag-shaped strps. It is also recommended to clamp then the filters with their cages in a liquid-tight manner between the transverse wall provided between the separation space and the collecting chamber and a base plate mounted in or attached to the vessel and to provide said transverse wall, said base plate and said cages with means, e.g. pins and holes, to keep the cages centered. In that manner the individual filters can be given, due to their star-shape, a very large area and said filters can be placed at short distances from one another without fear for local contact between the filtering cloths. Thus, many concentrical filtering cloths having large areas can be accommodated in a given volume.

It is also possible, according to the invention, to make the separation apparatus a horizontal one. In that case at least one multiple filter surrounding a collecting chamber which has a horizontal longitudinal axis and is connected to a discharge conduit for the heavier liquid is provided in the vessel. This multiple filter then has at least one pair of filters, of which one is separated from the other one by an intermediate chamber and surrounds the other one and each one has the shape of a horizontal tube having ends which are closed by plates. Advantageously, these filters of the or each multiple filter are mounted in the vessel for longitudinal horizontal movement or sliding in respect of each other and the vessel. In that case a plurality of multiple filters can be mounted one next to the other in the vessel, whereby the filter area is multiplied.

Although in this horizontal construction of the separation apparatus each space chamber within the multiple filter could communicate with the separation space through an individual set of vertical tubes, the dismantling of the individual tubular filters is considerably facilitated when at least on top of the or each filter surrounding an intermediate chamber a horizontal tube connected through vertical pieces of tubing to the highest region of said intermediate chamber and extending in the longitudinal direction of the filter is provided and at least one end of said tube is connected in a place beyond the respective end of the multiple filter to the separation space through a controllable valve member. The it is not necessary to detach all vertical pieces of tubing extending through various filters, when a filter has to be removed from the multiple filter.

The filters of the separation apparatuses according to the invention can be cleaned in a simple manner. To that end it is only necessary to open at least one of the conduits opening into or connected to the separation space and the passages or apertures provided between the intermediate chamber(s) of the multiple filter and the separation space and to supply heavier liquid through a conduit bypassing said filter, for instance through the discharge conduit for said liquid, to the collecting chamber for the heavier liquid. Preferably this cleaning operation is thus performed that the passages or apertures provided between the intermediate chamber(s) of the multiple filter and the separation space are so opened and closed during the supply of heavier liquids to the collecting chamber through a conduit bypassing said filter as to make the total amount of heavier liquid flow first through the filter of a pair of directly successive filters which is nearest to the collecting chamber and thereupon through this filter as well as through the other filter of said pair. Thereby it is achieved that first the lighter liquid and the impurities are rinsed from the first filtering cloth of said pair and discharged from the respective intermediate chamber directly to the separation space and thereafter the second filter is rinsed clean. The risk of forcing impurities and lighter liquid adhering in and on the surface of the first filtering cloth from said cloth into the meshes of the next filtering cloth is then considerably reduced.

Figure 4:
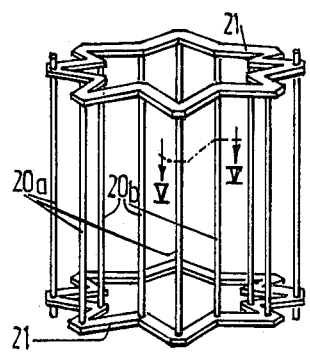
Figure 6:
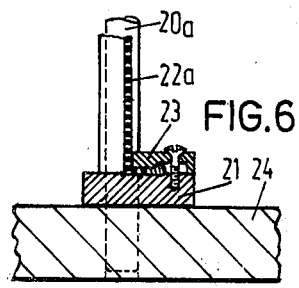
Figure 2:
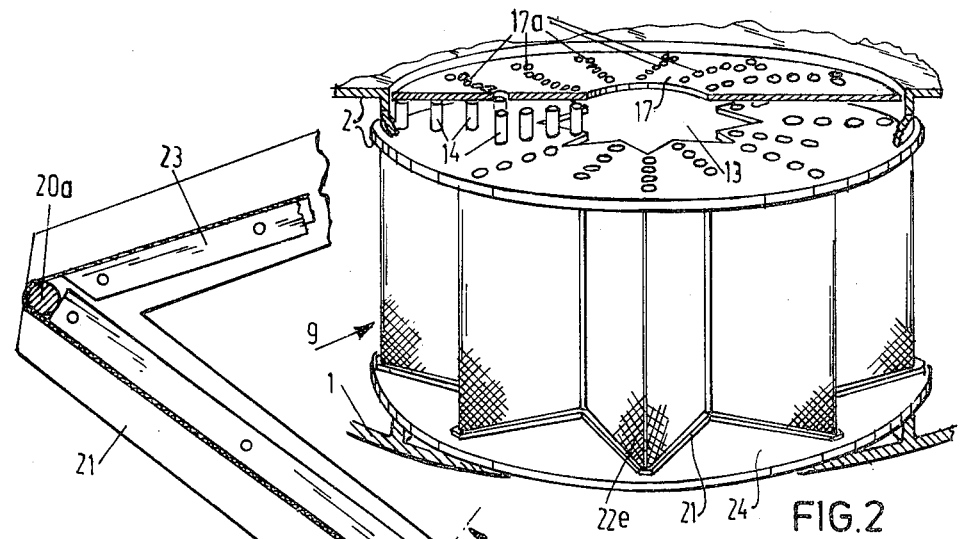
Figure 5:
Figure 3:
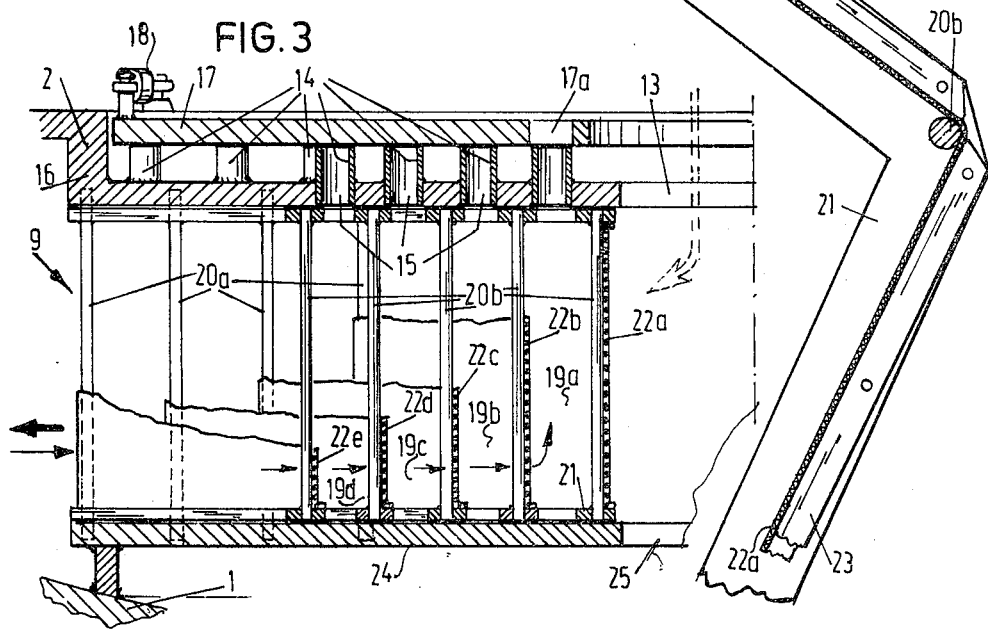

The invention will be further elucidated with the aid of the drawing. In the drawing:

FIG. 1 is a vertical sectional view of an apparatus according to the invention having a vertical vessel for the separation of a mixture of water and oil, FIG. 2 is, on a larger scale, a perspective view of a multiple filter used in the separation apparatus shown in FIG. 1, FIG. 3 is a vertical sectional view of the multiple filter shown in FIG. 2, FIG. 4 is a perspective view of a cage of the inner filter of the multiple filter illustrated in FIGS. 2 and 3, FIG. 5 is, on a still larger scale, a portion of the sectional view taken on line V—V in FIG. 4, FIG. 6 is a sectional view taken on line VI—VI in FIG. 5 and a portion of a base plate, FIG. 7 is a vertical longitudinal sectional view of a separation apparatus according to the invention having a horizontal vessel and FIG. 8 is, on a larger scale, a portion of a portion of a vertical cross-sectional view taken on the line VIII—VIII in FIG. 7.

In FIG. 1 a closed metal vessel is designated by 1. Provided in this vessel is a substantially horizontal partition or transverse-wall 2, which divides the vessel into an upper part and a lower part. The upper part of the vessel contains a bell 3 for the automatic control of the apparatus for the separation of a mixture of water and oil. This bell 3 is mounted for up and down movement between two end positions and it surrounds the separation space 4. Into this separation space a mixture supply conduit 5 opens and connected to said space 4 is an oil discharge conduit 6 having a valve 7 which is controlled in a not-described manner by the bell 3. A water discharge conduit 8 is connected to the lower part of the vessel. This lower part of the vessel contains a multiple filter 9, which only lets water through and separates the separation space 4 from a water collecting chamber 10 provided in the lower part of the vessel. The bottom of the vessel 1 has a discharge conduit 11 provided with a valve 12 to draw off mud, dirt and fibres collected on the bottom of the vessel.

The multiple filter 9 is mounted under the partition 2 and this partition is provided with a central opening 13 and with radial rows of small apertures 15 which are surrounded by short pieces of tubing 14 and used for purposes to be explained hereinafter. The short pieces of tubing 14 are covered at their upper ends by a plate 17 which is mounted for rotation in a recessed portion 16 of the partition 2. This plate 17 has holes 17a and it is adapted to be reciprocated from the outside by a cylinder 18 and a piston through a predetermined angle. In the shown embodiment the multiple filter 9 consists of five concentrical uniform filters, which are separated from one another by intermediate chambers 19a, 19b, 19c and 19d. The upper wall of these intermediate chambers is formed by a recessed portion of the partition 2. Connected to each intermediate chamber is a number of pieces of tubing 14. Each filter is provided with a star-shaped cage of the construction illustrated in FIG. 4. Such a cage consists of a plurality of vertical rods 20a arranged on a larger circle, a plurality of vertical rods 20b arranged between the rods 20a on a smaller circle and two zigzag-strips 21 which are attached to the ends of said rods and form closed star-shaped patterns. Each part of these strips extends between a rod 20a and a rod 20b. Two rods 20a project from the zigzag-strips 21 for the purpose to centre the cage. An endless filtering cloth 22a, 22b, 22c, 22d, 22e, respectively, is so bent over the rods 20a and 20b, as to give said cloth the shape of a star and owing thereto a very large area. The filtering cloth is attached with its upper edge and its lower edge to the zigzag-strips 21 by means of clamping strips 23 (see FIGS. 5 and 6).

The cages 20a, 20b, 21 and the filtering cloths 22a–e are clamped between the partition 2 and a base plate 24 which is also provided with a central opening 25 and rigidly attached to the vessel 1. The rods 20a of the filter cages which extend through the zigzag-strips 21 engage matching holes of the partition 2 and the base plate 24 and they keep the filters centred in respect of the vertical axis of the vessel.

In operation the water-oil-mixture to be separated is led into the separation space 4 through the conduit 5. In this space the segregation takes place and oil moves upwards and water downwards. As long as the valve 7 of the oil discharge conduit 6 is closed, only water is discharged through the multiple filter 9, the water collecting chamber 10 and the conduit 8 and the layer of the oil accumulating in the upper portion of the space confined by the bell becomes gradually thicker. After this layer has become so thick that the weight of the bell and its contents has been sufficiently diminished to let the bell float, the bell will move to its upper position and the valve 7 will be opened, so that also oil is discharged. If a sufficient quantity of oil has been discharged to let the bell 3 go back to its lower position, the valve 7 will be closed again.

Should the filtering cloths let pass oil, this oil will then accumulate in the intermediate chambers 19a–d. Also very fine mud can creep through the filtering cloths and it is then apt to stick in the meshes thereof, whereby the filter could become clogged. In order to prevent this, water can, at given intervals, be led back into the vessel through the conduit 8, while the oil discharge conduit 6 or an other conduit connected to the separation space 4 is opened. This back flowing water passes first the filtering cloth 22e which is nearest to the water collecting chamber 10 in opposite direction, since only the apertures 15 of the intermediate chamber 19d surrounded by said filtering cloth are opened. This has the effect that mud and oil particles stuck in said cloth 22e are rinsed off and will be propelled through the intermediate chamber 19d into the separation space. If thereafter the plate 17 is rotated one further step, only the apertures 15 of the next intermediate chamber 19c surrounded by the intermediate chamber 19d are opened and the apertures of the intermediate chamber 19d are closed again. In that position of the plate 17 only the filtering cloth 22d is rinsed clean. The plate 17 is rotated during such a time as to guarantee that all intermediate chambers are successively connected to the separation space and closed again, that means the outermost intermediate chamber first and the innermost intermediate chamber last, so that all filtering cloths are rinsed clean one after the other. Thereupon the plate 17 is returned to its starting position and the normal separation process starts again. The oil returned from the intermediate chambers 19a–b to the separation space 4 rises in said space and joins the layer of oil to be discharged. The mud will generally reach the bottom of the vessel through the central space of the multiple filter, from where it can be discharged through the conduit 11. In order to facilitate the transport of the mud from the intermediate chambers 19a–d through the separation space 4 and the central space of the filter towards the bottom of the vessel the partition and the base plate 24 may be made slightly conical.

The separation apparatus shown in FIGS. 7 and 8 is provided with a horizontal vessel 26 containing a separation space 27, into which a mixture supply conduit 28 opens and to which an oil discharge conduit 29 provided with a valve member 29 is connected.

In the lower part of the vessel 26 a plurality of multiple filters is provided one besides the other. These filters extend in the longitudinal direction of the vessel. Each filter surrounds a collecting chamber 30 for the heavier liquid, that means water in the present case. This collecting chamber is connected to a water discharge conduit 31. The discharge conduits 31 are connected to a common transversely directed drain pipe 32.

Each multiple filter 29 consists of three substantially concentrical, horizontal, tubular filters, each of which is constructed as a cage 33a, 33b, 33c of which at least the vertical longitudinal walls are clad with filtering cloth 34a, 34b, 34c letting through only water. In this construction the lower wall 35a, 35b, 35c and the upper wall 36a, 36b, 36c consist of plates. The lower walls 35a, 35b, 35c are provided with rollers 37a, 37b, 37c, by means of which the filters are movably supported on rails 38a, 38b, 38c attached to the lower plate 35b, the lower plate 35c and the bottom of the vessel 26, respectively.

Mounted on top of each upper plate 36a, 36b, 36c is a horizontal tube 39a, 39b, 39c extending in the longitudinal direction of the multiple filter. This tube is in open connection with the water collecting chamber 30, the intermediate chamber 41a found between the filters 34a and 34b and the intermediate chamber 41b confined between the filters 34b and 34c, respectively, by means of vertical pieces of tubing 40a, 40b, 40c. The right hand ends of the tubes 39a, 39b, 39c are inserted into passages of a wall 42. By means of a slide valve 44 comprising an opening 45 and operated by a cylinder 43 with piston these passages can be brought into communication with the separation space 27 and closed again one after the other.

The ends of the horizontal tubular filters are closed by plates 46 and 47, from which the filters can be easily detached.

The vessel is provided at its one end wall with an opening closed by a detachable cover 48. The filters can be moved out of the vessel and be placed therein through said opening.

For the purpose of rinsing the filters water is supplied to the water collecting space 30 through the water discharge conduit 32, 31 and the valve 29a of the oil discharge conduit 29 is opened, whereas the tubes 39a, 39b, 39c are so opened and closed by the slide valve 44, 45 as to make and break their connection with the separation space 27 one after the other. Thus the filtering cloths 34a, 34b, 34c are rinsed clean one after the other and the oil collected in the upper parts of the collecting chamber 30 and the intermediate chambers 41a and 41b is returned to the separation space 27.

What I claim is:

1. Apparatus for separating a mixture of immiscible liquids of different specific gravities, comprising in combination:
    a closed vessel having a substantially horizontal partition defining upper and lower chambers above and below said partition, said partition having a substantially central opening which communicates the two chambers;
    a supply conduit having an outlet discharging said mixture into said upper chamber at a region below the top of the vessel, and a discharge conduit having an inlet disposed above said outlet of the supply conduit whereby to remove the lighter liquid which collects by gravity separation at the uppermost region of said upper chamber;
    a filter assembly disposed in said lower chamber and cooperating with said partition to provide a collection chamber which surrounds said filter assembly to collect substantially only the heavier liquid, there being a second discharge conduit having an inlet in said collection chamber whereby to discharge heavier liquid from the vessel, said filter assembly comprising at least one pair of radially spaced, tubular filter elements disposed concentrically of said opening to define an intermediate chamber therebetween; and at least one tapping passage for leading lighter liquid from the uppermost region of said intermediate chamber directly into the lowermost region of said upper chamber, and a valve member associated with said tapping passage for opening and closing same.

2. Apparatus as defined in claim 1 including a base plate disposed below and parallel to said partition, said filter elements extending vertically between said partition and base plate.

3. Apparatus for separating a mixture of immiscible liquids of different specific gravities, comprising in combination:

a vertically elongate, closed vessel defining a vertical axis and having top and bottom walls and a substantially horizontal partition disposed in closely spaced relation above said bottom wall, said partition dividing the interior of said vessel into a separation chamber of relatively large height above said partition and a lower chamber of relatively small height below said partition;

said partition having a central opening concentric with said axis of the vessel, and a filter assembly disposed wholly below said partition, said filter assembly including at least two radially spaced, tubular filter elements disposed concentrically with respect to said axis and with the inner one of said elements defining a well communicating directly with said separation chamber through said opening in the partition, said filter assembly cooperating with said partition and the bottom wall of the vessel to define a collection chamber for the heavier liquid in surrounding relation to said filter assembly and separated from said well by at least an intermediate chamber defined between said radially spaced filter elements;

a supply conduit having an outlet disposed in spaced relation above said partition but spaced below said top wall of the vessel whereby gravity separation of heavier and lighter liquids is free to take place throughout the cross section of said vessel above the partition as well as throughout the cross section of said well below the partition, a first discharge conduit having an inlet spaced above said outlet of the supply conduit whereby to discharge the lighter liquid which collects in the uppermost region of the vessel, and a second discharge conduit having an inlet in said collection chamber whereby to discharge the heavier liquid from the vessel, and at least one tapping passage for leading lighter liquid from the uppermost region of said intermediate chamber back to said separation chamber directly above said partition, and a valve member associated with said tapping passage to open and close same.

4. Apparatus as defined in claim 3 including a base plate disposed in spaced parallel relation below said partition, said filter elements extending between said base plate and partition.

* * * * *